United States Patent
Sharma et al.

(10) Patent No.: US 10,938,667 B2
(45) Date of Patent: Mar. 2, 2021

(54) INCREMENTAL INTENT CHECKING FOR STATEFUL NETWORKS

(71) Applicant: HEWLETT PACKARD ENTERPRISE DEVELOPMENT LP, Houston, TX (US)

(72) Inventors: Puneet Sharma, Palo Alto, CA (US); Huazhe Wang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/227,502

(22) Filed: Dec. 20, 2018

(65) Prior Publication Data

US 2020/0204454 A1 Jun. 25, 2020

(51) Int. Cl.
*H04L 12/24* (2006.01)
*H04L 12/741* (2013.01)
*H04L 29/06* (2006.01)
*H04L 12/715* (2013.01)

(52) U.S. Cl.
CPC .......... *H04L 41/145* (2013.01); *H04L 41/044* (2013.01); *H04L 41/0836* (2013.01); *H04L 45/04* (2013.01); *H04L 45/74* (2013.01); *H04L 63/0254* (2013.01)

(58) Field of Classification Search
CPC ... H04L 41/145; H04L 41/0893; H04L 45/64; H04L 63/20; H04L 67/10; H04L 41/16; H04L 41/142; H04L 41/0836; H04L 41/044; H04L 45/74; H04L 45/04; H04L 63/0254
See application file for complete search history.

(56) References Cited

U.S. PATENT DOCUMENTS 9,787,572 B2 10/2017 Voit et al.
9,806,991 B2 10/2017 Lucas et al.
(Continued)

OTHER PUBLICATIONS

Beckett et al., "A general approach to network configuration verification", Proceedings of the Conference of the ACM Special Interest Group on Data Communication, pp. 155-168.
(Continued)

*Primary Examiner* — Jungwon Chang
(74) *Attorney, Agent, or Firm* — Nolte Lackenbach Siegel

(57) ABSTRACT

An example method including identifying an intent-based stateful network having a first endpoint, a second endpoint, and one or more devices performing stateful network functions between the first endpoint and the second endpoint. Further, constructing a causality graph of the network, the causality graph having a plurality of nodes for each of the one or more devices performing stateful network functions, wherein the connecting comprises connecting the first endpoint, the second endpoint, and the one or more devices performing stateful network functions to show causal relationships between the first endpoint and the second endpoint and the one or more devices performing stateful network functions. Also, determining whether the connections between the first endpoint, the second endpoint, and the one or more devices performing stateful network functions provide a path from the first endpoint and the second endpoint, and updating, incrementally, the causality graph as a change to the network occurs.

20 Claims, 8 Drawing Sheets

(56) References Cited

U.S. PATENT DOCUMENTS

| | | | |
|---|---|---|---|
| 2002/0178246 A1* | 11/2002 | Mayer | H04L 41/0893 709/223 |
| 2014/0369209 A1 | 12/2014 | Khurshid et al. | |
| 2018/0077061 A1 | 3/2018 | Horn et al. | |
| 2018/0124008 A1* | 5/2018 | Tackabury | H04L 67/10 |
| 2018/0351822 A1 | 12/2018 | Mohanram et al. | |
| 2018/0367417 A1 | 12/2018 | Dixit et al. | |
| 2019/0007453 A1* | 1/2019 | Nimmagadda | H04L 63/20 |
| 2019/0166013 A1* | 5/2019 | Shaikh | H04L 45/64 |
| 2019/0182119 A1* | 6/2019 | Ratkovic | H04L 41/145 |
| 2019/0238410 A1* | 8/2019 | Kang | H04L 41/145 |

OTHER PUBLICATIONS

Kazemian et al., "Header Space Analysis: Static Checking for Networks", Proceedings of the 9th USENIX conference on Networked Systems Design and Implementation, 2012, 14 pages.

Malik et al., "Boolean satisfiability from theoretical hardness to practical success", Communications of the ACM—A Blind Person's Interaction with Technology, vol. 52, Issue 8, Aug. 2009, pp. 76-82.

Moura et al., "Satisfiability modulo theories: introduction and applications", Communications of the ACM, vol. 54, Issue 9, Sep. 2011, pp. 69-77.

Panda et al., "Verifying Reachability in Networks with Mutable Datapaths", 14th USENIX Symposium on Networked Systems Design and Implementation, 2017, pp. 699-718.

Stoenescu et al., "Symnet: Scalable symbolic execution for modern networks", SIGCOMM '16, Aug. 22-26, 2016, 14 pages.

Bakhshi et al, Towards Dynamic Network Policy Composition and Conflict Resolution in Software Defined Networking, IEEE Spectrum, Dec. 30-31, 2017, 4 Pgs, https://ieeexplore.ieee.org/document/8320162.

Classifying Network Traffic Using NBAR, Cisco, Mar. 14, 2018, 38 Pgs. https://www.cisco.com/c/en/us/td/docs/ios-xml/ios/qos_nbar/configuration/xe-16-6/qos-nbar-xe-16-6-book/clsfy-traffic-nbar.pdf.

Intent-based Networking Building the bridge between business and IT, Cisco, 2017, 11 Pgs. https://www.cisco.com/c/dam/en/us/solutions/collateral/enterprise-networks/digital-network-architecture/nb-09-intent-networking-wp-cte-en.pdf.

Kazemian, P. et al., Real Time Network Policy Checking Using Header Space Analysis, (Research Paper), Retrieved Nov. 2, 2018, 13 Pgs.

Khurshid, A. et al., VeriFlow: Verifying Network-wide Invariants in Real Time, (Research Paper), Retrieved Nov. 2, 2018, 13 Pgs.

The eight most common use cases for the Forward Platform, Forward Networks, Mar 15, 2018, 14 Pgs. https://www.forwardnetworks.com/wp-content/uplods/2018/03/Use-Case-White-paper-1.pdf.

Valenza et al, A Formal Approach for Network Security Policy Validation, Mar. 2017, 22 Pgs. http://isyou.info/jowua/papers/jowua-v8n1-4.pdf.

Yuan et al, NetSMC: A Symbolic Model Checker for Stateful Network Verification, Feb. 14, 2018, 24 Pgs. https://www.andrew.cmu.edu/user/yifeiy2/publication/netsmc.pdf >.

Zhou, W. et al., Enforcing Customizable Consistency Properties in Software-defined Networks, (Research Paper), May 4-6, 2015, 14 Pgs.

\* cited by examiner

INCREMENTAL INTENT CHECKING FOR STATEFUL NETWORKS

BACKGROUND

Network intents generally refer to network-wide objectives. Intent-based networking attempts to make networks more reliable and efficient by automatically converting network intents into detailed network configurations that implement the network intents. Network policies, such as reachability and service chaining, may be implemented through various network functions, such as simple switches and routers, to more complex stateful functions, such as firewalls, network address translation, and load balancers. Network verification, in order to verify that a network correctly implements network policies, may thereby prevent network failure, while improving network security and safety.

DETAILED DESCRIPTION

Figure 1:
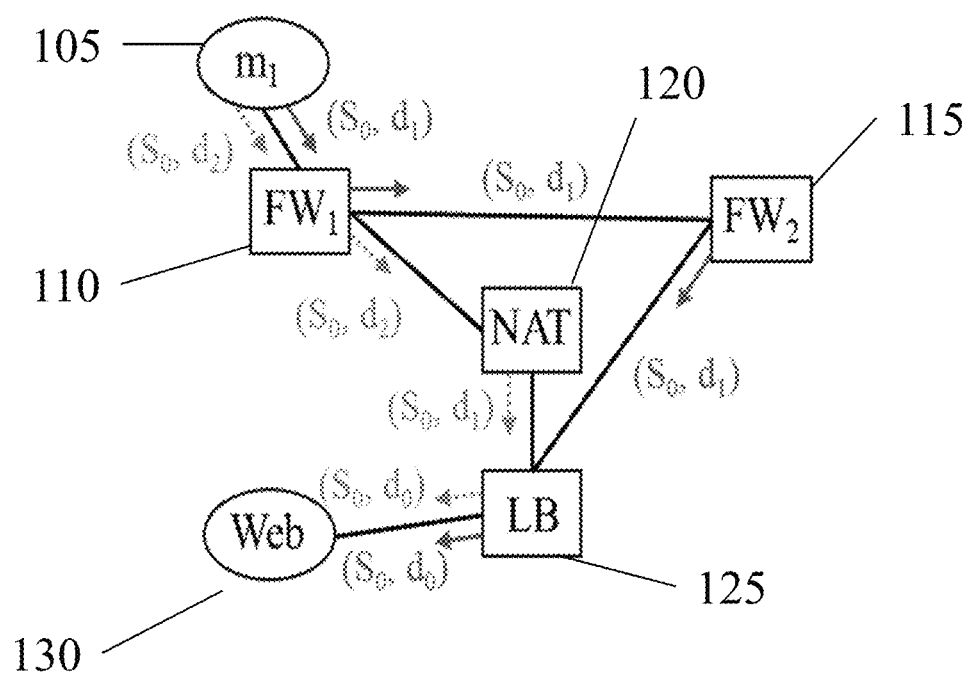
FIG. 1 illustrates a schematic representation of an example network in accordance with the present disclosure.

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Intent-based networking uses software to plan, design, and implement changes to a network without user intervention, thereby improving network availability and adaptability. In intent-based networking, a user provides a network an "intent". The intent is an indication of what the user wants to happen within the network, i.e., a desired state of action that the network is going to undertake. The user does not provide the network configuration parameters, and as such, the network must determine what actions are necessary to fulfill the intent. After the network determines what changes may be applied to meet the intent, the network can perform the changes without receiving explicit instructions from a user. As the intent-based network is determining what changes may be made, the network is receiving information about the current state of the network and devices therein.

Network configurations in intent-based networking may continuously change in order to meet the evolving requirements of business growth, including hardware and software maintenance, as well as making changes to address security and performance issues. For example, network components may be added or removed from the network and network functions may be reconfigured to improve network speed, efficiency, etc. The majority of network failures occur as a result of changes to the network. To prevent failures in an intent-based network, the intents and expectations of a user during changes to the intent-based network should be met.

As mentioned above, changes to network configurations result in the majority of network failures. For example, misconfigured network functions may result in network policies being violated, thereby resulting in a failure to the network or specific network devices. To prevent changes in an intent-based network from resulting in network failure, tools are used to verify that the intents and expectations of the user are met.

Network verification tools, such as Veriflow and Header-Space Analysis, may be used to avoid misconfigurations within a network and to verify that changes to configurations are in accordance with the intended policies of the user. However, such network verification tools assume that the network data plane is stateless and implements a limited set of actions. Stateful networks include stateful network functions and devices, and as such, the network verification tools cannot verify the correctness of the network.

Stateful networks refer to networks that contain, stateful network functions. Compared with switches and routers, stateful network functions implement more diverse functions and the packet behavior within such networks may depend on packet history. Examples of stateful network functions may include firewalls that allow inbound packets if they belong to established connections and web proxies that cache popular content. As stateful network functions become more common, more efficient network configuration validation under network dynamics may be required.

Network validation for stateful networks, such as Minesweeper and VMN, encode all packet behavior within a network using first-order logic and uses modern solvers, such as Satisfiability Modulo Theories ("SMT"), to check for network-wide intent violations. Such solvers rely on optimizations to identify logically independent network slices. However, there is no guarantee that such slices are of usable size or exist, especially when there are packet transformers that modify packet headers. Additionally, such solutions solve all constraints as a whole, thereby preventing previous results from being reused when the network changes.

Examples provided herein provide methods and systems for intent checking in a stateful network. Moreover, by using a causality graph, the intent checking may occur incrementally, thereby saving system resources and allowing for faster intent checking as network size increases. Such example implementations, as are provided in detail below, may allow for the end-to-end reachability within a network to be checked. Reachability refers to the ability of one endpoint in an intent-based network to access another endpoint in the intent-based network.

To verify reachability, concrete and state constraints required to achieve the reachability within each segment of the network may be checked using an SMT solver, as explained above. A path is not valid if any segment on the path is not satisfiable. The solver may then return a corresponding packet sequence required for the reachability for each segment. To achieve end-to-end, reachability, checking results from each segment must be consistent with each other among the entire network, e.g., a required packet from a network function must not be dropped at an upward network function, the packet must be sent and received along a path between network functions in a sequential order. This procedure is then repeated continuously whenever a network change occurs for network verification.

After determining the links between the network functions after each segment of the network is checked, a causality graph is generated that stores all checked results. End-to-end intent checking for the network may then be incrementally checked by traversing the causality graph. The results of the intent checking may be stored, and as changes occur to the network, the affected intents may be identified, and the causality graph may be incrementally updated. Such causality graphs with incremental updates may thereby allow solver-based network verification tools to check for network wide intent violations incrementally, reducing overhead use of system resources when network changes occur.

Turning to FIG. 1, a schematic representation of an example network in accordance with the present disclosure is shown. Network 100 includes a host ($m_1$) 105, a first firewall ($FW_1$) 110, a second firewall ($FW_2$) 115, a network address translation ("NAT") 120, a load balancer (LB) 125, and a destination (Web) 130. Host 105 may be a user or one or more computing devices, while destination (Web) 130 may be one or more web services, one or more network services, and/or one or more computing devices. First and second firewalls 110 and 115, respectively, NAT 120, and load balancer 125 are network functions within network 100. A brief explanation of the network functions illustrated herein, as well as other potential network functions is provided below.

As used herein, "network functions" may employ various actions. Such network functions may be virtualized network functions that are responsible for handling specific network functions that run on virtual machines over a hardware networking infrastructure, e.g., routers, switches, services, cloud computing systems, etc. Examples of network functions include, proxies, firewalls, NATs, load balancers, and the like.

A proxy may be a network function that serves as an intermediary between a client and a server. The proxy may terminate a request packet from a client and initiate a new packet to a server. Accordingly, a proxy may respond to certain incoming packets while blocking or otherwise rejecting other packets. In operation, a proxy may serve as a gateway between two or more networks, thereby making tampering with internal systems more difficult and providing security to a network.

A firewall may be a network function that acts as a network security system, that monitors and controls incoming and outgoing network traffic based on predetermined rules. Firewalls may be used to create a barrier between internal and external networks. For example, a firewall may be used to create a barrier between a trusted network, e.g., local network, and a potentially untrusted external network, e.g., the Internet. Firewalls may include packet filters, stateful filters, and application, layer filters and may be network-based or host-based, as well as software or hardware-based. Firewalls may further have NAT functionality, as will be explained below.

Network address translation, NAT, is a method of remapping one internet protocol ("IP") address space into another by modifying network address information in the IF header of packets while they are in transit across a traffic routing device. For example, a NAT may allow a device, such as a router, to act as an agent between a public network, e.g., the Internet, and a private network, e.g., a local network. As such, only a single unique IP address may be required to represent a group of computers to anything outside their network.

Networks may further include network functions such as one or more load balancers, which is a device that acts like a reverse proxy and distributes network or application traffic across a number of servers. In operation, load balancers uniformly distribute packets heading to a shared address to a set of servers, thereby increasing network capacity, improving resource use, maximizing throughput, minimizing response time, and avoiding overload of a single network resource.

Other network functions may also be included within a specific network. For example, in addition to proxies, firewalls, NATs, and load balancers, networks may include caches, intrusion detection systems, accelerators, and the like. Those of ordinary skill having benefit of the present disclosure will appreciate that the specific network functions identified are not a limitation, and additional network functions may be employed according to the methods and systems described herein.

Turning back to FIG. 1, packets may be sent between host 105 and destination 130 through the various network functions. The term "packets", in information technology, refers to a collection of data that may be used by computing devices that communicate with one another, such as in network 100. Individual packets include packet headers, which are the portion of the packet that precedes the packet body and contains addressing and other data that is required for the packet to reach its intended destination.

The packet header may contain information such as a source S and a destination d for each packet. The source S refers to the location from where the packet was initially sent and the destination d refers to the location where the packet is being sent next within the network. Both the source S and destination d address of specific packets may be modified during the forwarding path of the packet. As such, the source S of particular packets will be either the address of the original source host or the device that modified the source address. For example, first and second firewalls 110 and 115 do not change a destination d designation because their function is to either allow the packet through or reject the packet. However, NAT 120 and load balancer 125 may change the destination based on the requirements of network 100.

In FIG. 1, two different paths for packets to travel within network 100 between host 105 and destination 130 are illustrated. A first path is indicated by solid line arrows, while a second path in indicated with hatched line arrows. The first path connects host 105 to destination 130 through first firewall 110, second firewall 115 and load balancer 125. The second path connects host 105 to destination 130 through first firewall 110, NAT 120, and load balancer 125.

A first packet (not independently illustrated) traveling along the first path leaves host 105 with a packet header indicating a source $S_0$ and a destination $d_1$. The packet travels through first firewall 110, wherein neither source $S_0$ nor destination $d_1$ are modified. The packet continues along the first path to second firewall 115, where the packet travels through without modification of source $S_0$ or destination $d_1$. The packet continues to load balancer 125, wherein the source $S_0$ remains the same, but the destination $d_1$ is modified to $d_0$, indicating that the packet will continue to destination 130, which has a destination value of $d_0$. Accordingly, the packet may travel from host 105 to destination 130.

A second packet (not independently illustrated) may also travel within network 100 between host 105 and destination 130. In this example, the second packet may travel from host 105 to first firewall 110, wherein the packet has header information indicating a source $S_0$ and destination $d_2$. The packet continues through first firewall 110 to NAT 120. NAT 120 accepts the second packet however, the destination of the second packet is modified to $d_1$, to match the destination value for load balancer 125. The source $S_0$ of the second packet remains the same. In load balancer 125 the destination d of the second packet is further modified to $d_0$, to match the destination value of destination 130. The packet may then be sent from load balancer 125 to destination 130 without further modification and without proceeding through other network functions.

Certain network functions have concrete constraints that do not change within a specific network. In this example, the network functions may have concrete constraints on the headers of incoming and/or outgoing packets. For example, NAT 120 translates a destination address to another destination address, i.e., $d_2$ to $d_1$, as indicated in the second path, above. Load balancer 125 uniformly distributes packets heading to its shared address to a set of services, in this case destination 130 having a destination value of $d_0$. Such concrete constraints are specified in the network function configurations and may be propagated along the network path, which allows for the removal of redundant information that a SMT solver might otherwise have to discover for itself. Additionally, state constraints refer to the local packet processing history at a specific network function. Accordingly, to check whether a state could be valid, only constraints within the specific network function need to be included.

As such, the concrete and state constraints required to achieve reachability within each segment of a network can be checked using a SMT solver. A path within the network is not valid if any segment on the path is not satisfiable. To achieve the desired end-to-end reachability, checking results from each segment require consistency with each other among the entire network. For example, a packet received at a specific network function must not be dropped at an upward network function. If the packet is dropped, the path is not satisfiable, indicating possibility for a network failure. Thus, the packet must be sent and received between network functions along a path in a sequential order. When a network change is indicated, this procedure for validating the network is repeated. For example, if a third firewall (not illustrated) is added to network 100, between second firewall 115 and load balancer 125, the first path would be retested in order to verify that a packet is not dropped between second firewall 115 and the third firewall or between the third firewall and load balancer 125.

After the results of network 100 are checked, as explained above, a causality graph may be created that stores the checked results.

Figure 2:
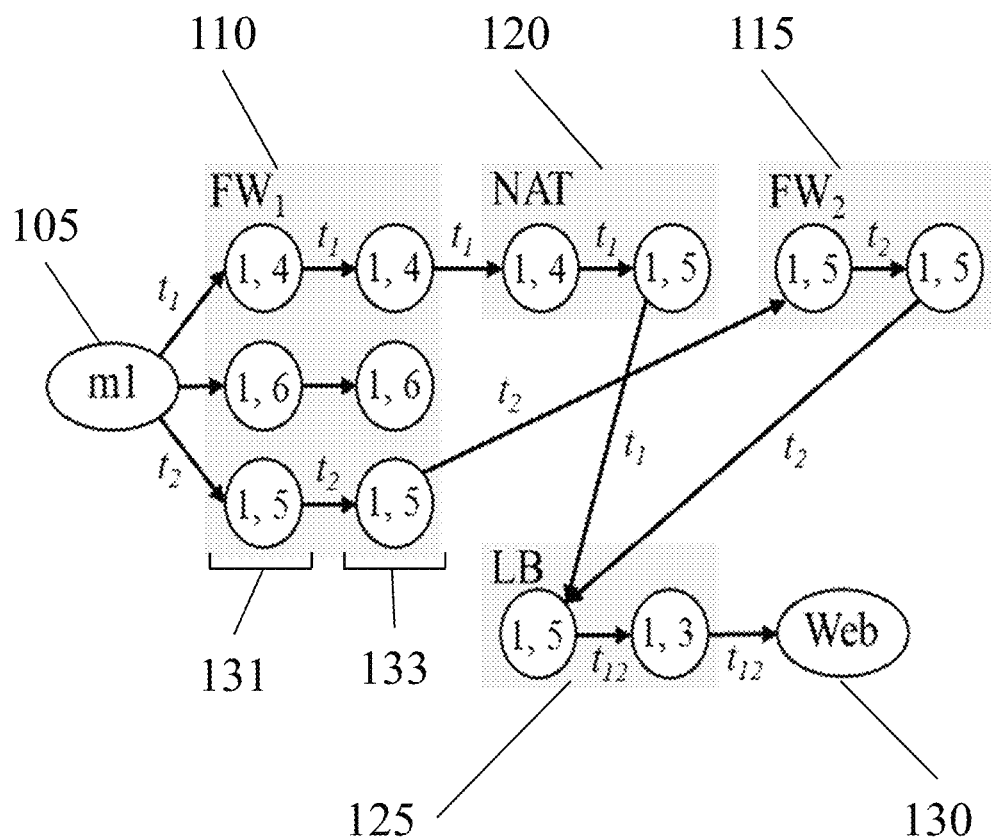
FIG. 2 is a causality graph of the network of FIG. 1 in accordance with the present disclosure.

Turning to FIG. 2, a causality graph for network 100 of FIG. 1 in accordance with the present disclosure is shown. A causality graph 135 may be constructed based on the checking results for the reachability between a first endpoint, host 105, and a second endpoint, destination 130. Causality graph 135 includes representation for host 105, first firewall 110, second firewall 115, NAT 120, load balancer 125, and destination 130. In addition to endpoints and stateful network functions, nodes in causality graph 135 represent either a packet sending or receiving event. Each node includes a pair of addresses specifying the source and destination addresses of the packet, respectively. For example, within first firewall 110 there are six nodes representing six send or receive events. In causality graph, for first firewall 110, the receiving nodes 131 are indicated as the first nodes connected to host 105. The sending nodes 133, are the nodes that send packets from first firewall 110 to other network functions within causality graph 135. Each network function within causality graph 135 includes receiving nodes 131 and sending nodes 133.

Each sending node 133 includes a source address for each of the nodes. However, specific nodes may include different destination addresses. Each address in a sending or receiving node refers to an address group in network 100. Specific endpoints and/or network devices may include multiple addresses. The specific source and destination address for specific location and network functions within causality graph 135 will be explained in detail below.

Edges within the causality graph 135 indicate a causal relationship between specific network events. For a single network function, a causality graph 135 may be constructed illustrating a packet being sent and/or received based on the satisfiability assignment from the SMT, as described above with respect to FIG. 1. When there are more than one network function, a received packet is traced back along a selected path to verify from where the packet was sent. If a corresponding packet sending node already exists, an edge may be added between the sending and receiving node. If a corresponding packet sending node does not exist, the packet sending is checked within the upward network function and other nodes or edges are added, if necessary. This procedure continues until, the packet receiving is traced back to an endpoint.

In FIG. 2, causality graph 135 provides a schematic representation for the reachability between host 105 and destination 130 that, has two potential paths. Addresses for locations and network functions are represented as integers. Host 105 is represented as integer 1 and destination 130 is represented as integer 3. Load balancer 125 has a shared address represented as integer 5. NAT 120 maintains two deterministic atomic addresses mapping from 4 to 5 and from 6 to 7.

A first path $t_1$ is provided from host 105 to first firewall 110, then to NAT 120, then to load balancer 125, and finally to destination 130. Possible packets received by first firewall 110 are packets having source and destination designations (1, 4) and (1, 6), as NAT 120 accepts packets with destination designations 4 and 6, as defined above. It is assumed that both packets are allowed by first firewall 125. As illustrated, only the packet having (1, 4) goes through to NAT 120, and NAT 120 transforms the packet to have a designation of (1, 5) so that the packet may travel to load balancer 125. The packet designation is then changed from (1, 5) to (1, 3) by load balancer 125 and is sent to destination 130 because destination 130 is represented by integer 3.

Similarly, nodes and edges for a path from host 105 to first firewall 110 to second firewall 115 to load balancer 125 and finally to destination 130 are created. Following a second path t₂, a packet having source and destination designation (1, 5) is sent from host 105 to first firewall 110. First firewall 110 accepts the packet and sends it to second firewall 115, which passes the packet through to load balancer 125, which accepts packets having a destination designation of 5. Load balancer 125 then changes the packet from designation (1, 5) to designation (1, 3), and the packet is sent to destination 130 because destination 130 is represented by integer 3.

Based on the causal relationship, the first path t₁ is valid if it does not contain a loop, thereby indicating that there exists a time sequence for all packets sent and received to achieve end-to-end reachability. Said another way, the path, either t₁ or t₂ is valid if the packet may be sent between host 105 and destination 130 without entering a loop. The loop would indicate that the packet cannot be sent therebetween and would indicate that the specific path is not valid. In this example, both paths t₁ and t₂ are valid. Any results, including both satisfied and unsatisfied checking, are stored in the graph. As the graph can be shared between different, intents, only one graph is required.

Causality graph 135 may be used to validate connections between endpoints and network function to determine the status of a network. If a packet cannot travel between specific endpoints and/or network functions, there may be a failure in the network 100. Causality graph 135 may be updated as changes to network 100 occur. Such incremental updates to causality graph 135 are explained in detail below.

Figure 3A:
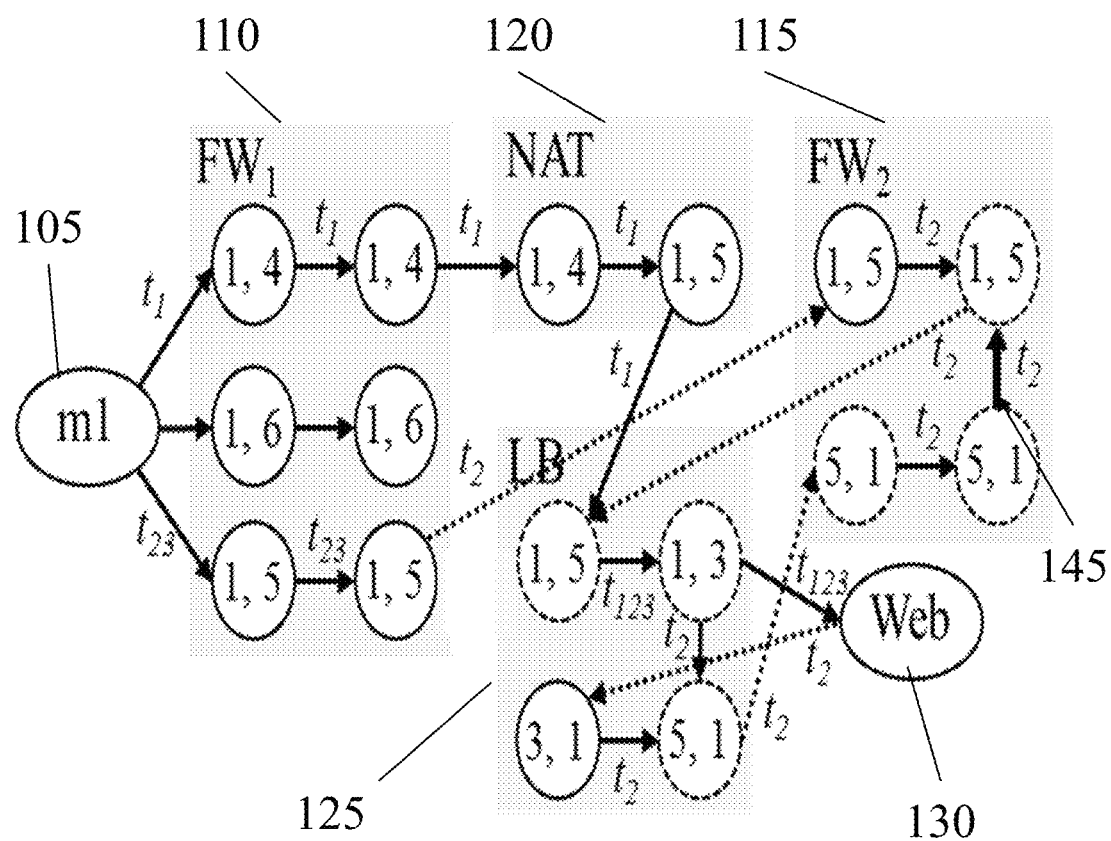
FIG. 3A is the causality graph of FIG. 2 under a rule change in accordance with the present disclosure.

Turning to FIG. 3A, the causality graph of FIG. 2 is illustrated under a rule changes in accordance with the present disclosure. As with FIG. 2, FIG. 3 illustrates a causality graph 140 having a host 105, a first firewall 110, a second firewall 115, a NAT 120, a load balancer 125, and a destination 130. The causality graph 140 further includes a plurality of nodes having a pair of addresses specifying the source and destination addresses for each packet.

To identify a set of intents that may be affected by changes to the network, each node in causality graph 140 maintains an attribute specifying the set of intents and corresponding paths that create the specific node. For example, the packet receiving (1, 5) in second firewall 115 is created by the reachability intent along the path between first firewall 110, second firewall 115, and load balancer 120. When a new rule is inserted at a specific network function, first the identity of existing packet receiving nodes are identified that match the new rule. The set of intents in the attributes of those nodes, as well as the intents that rely on those nodes are rechecked. Additionally, the new rule may change the behaviors of receiving packets that have not been added to causality graph 140. While existing satisfied checking results do not rely on those nodes, other intents with unsatisfied checking results within the network functions should be checked.

To further explain the effect on causality graph 140 as a result of a rule change, a deny rule is introduced into the network. The deny rule adds the edge 145 to causality graph 140 and deny rule indicates that second firewall 115 should deny packets having a source and destination of (1, 5). Now, in order for second firewall 115 to accept a packet having (1, 5), the packet must have previously been accepted by second firewall 115 having a source and destination (5, 1), e.g., a reverse packet. Acceptance of packet (1, 5) based on prior receiving of packet (5, 1) occurs because the second firewall 115 had previously accepted a packet having the reverse source and destination. Said another way, because a reverse packet (5, 1) was previously accepted, a local state at second firewall 115 is established. Accordingly, packet (1, 5) will match the state and be accepted by second firewall 115 even if it is denied by the rule.

In this example, the sending of (5, 1) to second firewall 115 can be traced back to load balancer 120, which received a packet (3, 1) which is traced back to destination (Web) 130, which send packet (3,1). Based on the operating model of load balancer 120, packet (5, 1) is a reply packet from the server-side destination (Web) 130 to the client-side host 105, which relies on a pervious reverse request for packet (1, 3). Causality graph 140 may thus be updated, as illustrated, to include all the nodes and edges, represented as added arrows between the nodes. The rule change introduced by the deny rule results in t₂ being a loop. When a loop occurs, the path becomes invalid because there is no reachability. Thus, in this example, when the loop occurs, all edges between network functions tagged by invalid path t₂ are removed from causality graph 140. All edges and nodes within network functions that still reflect current network states that are unchanged, e.g., nodes and edges in second firewall 115. The changes to causality graph 140 may then be saved and reused in subsequent network checks.

Figure 3B:
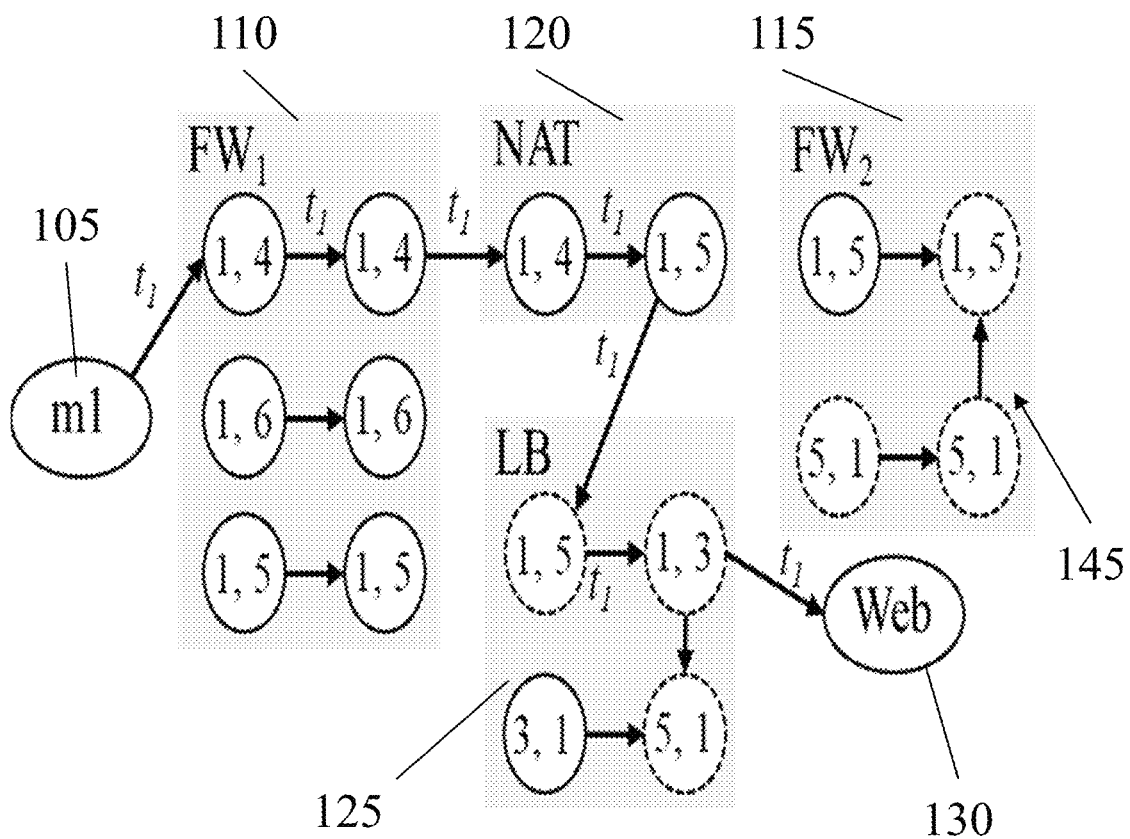
FIG. 3B is the causality graph of FIG. 3A after updating due to a deny rule in accordance with the present disclosure.

Turning briefly to FIG. 3B, causality graph 140 after the update caused by the deny rule is shown. As explained above, updated causality graph 140 retains the nodes in second firewall 115 but removes path t₂ and all edges associated therewith. This updated causality graph 140 may now be saved and reused in subsequent network checks.

Turning back to FIG. 3A, in other examples, a rule may be deleted. When a rule is deleted, intents that rely on receiving packets matching the rule will be rechecked, as the packets will now be subject to lower priority rules. As a result, the nodes and connections therebetween may change, resulting in updates to causality graph 140. The updates may include the removal of nodes and or edges, as paths within the network may no longer be valid. Alternatively, certain rules may result in additional potential paths that could require the addition of nodes and edges.

In still other examples, a link up may occur. Link up may result from a new connection being established between two network functions. In the illustrated example, a link was made between first firewall 110 and load balancer 120 whereby first firewall 110 may send a packet having a source and destination of (1, 5) and load balancer 120 may accept the packet.

Figure 3C:
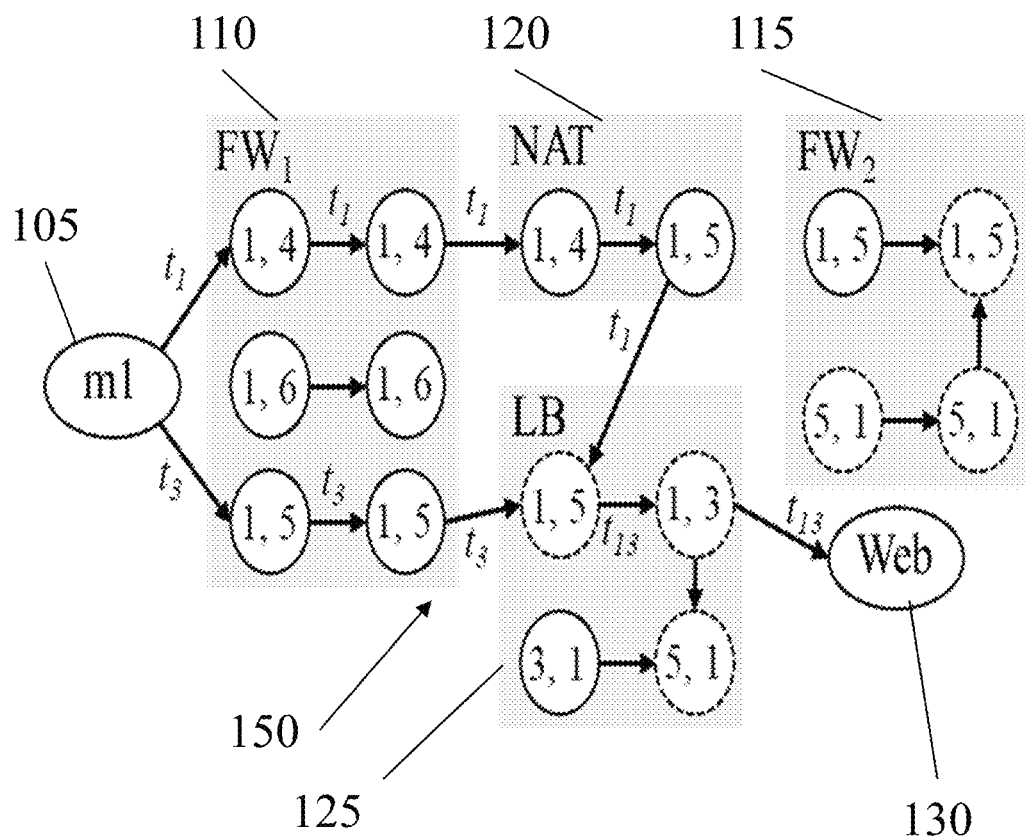
FIG. 3C is the causality graph of FIG. 3A after, updating due to a link up in accordance with the present disclosure.

Turning briefly to FIG. 3C, an updated causality graph 140 for the link up 150, described above with respect to FIG. 3A, is shown. In this example, causality graph 140 may be updated to reflect the change cause by the link up 150. For each intent, new paths that traverse the new link are identified and checked to see if the paths are valid. If the paths are valid, causality graph 140 is updated to reflect a new path t₃, which passes packet (1, 5) from first firewall 110 to load balancer 120. As illustrated, path t₃ provides new edges in causality graph 140 indicating a new path for reachability between host 105 and destination 130.

In contrast, when a link goes down, all the edges on causality graph 140 using the link are deleted. Accordingly, all paths that pass through the edges are also removed from causality graph 140.

In view of the above, causality graph 140 may be incrementally updated as changes to a network occur. For example, changes to intents, changes to physical connections, changes to the topology, changes to network functions, changes to devices, etc., may result in changes to the reachability between endpoints in the network. As such changes occur, connections between endpoints and network functions may be rechecked and causality graph 140 updated accordingly. Methods for implementing changes to causality graph, such as causality graph 140 of FIG. 3 are discussed in detail below.

Figure 4:
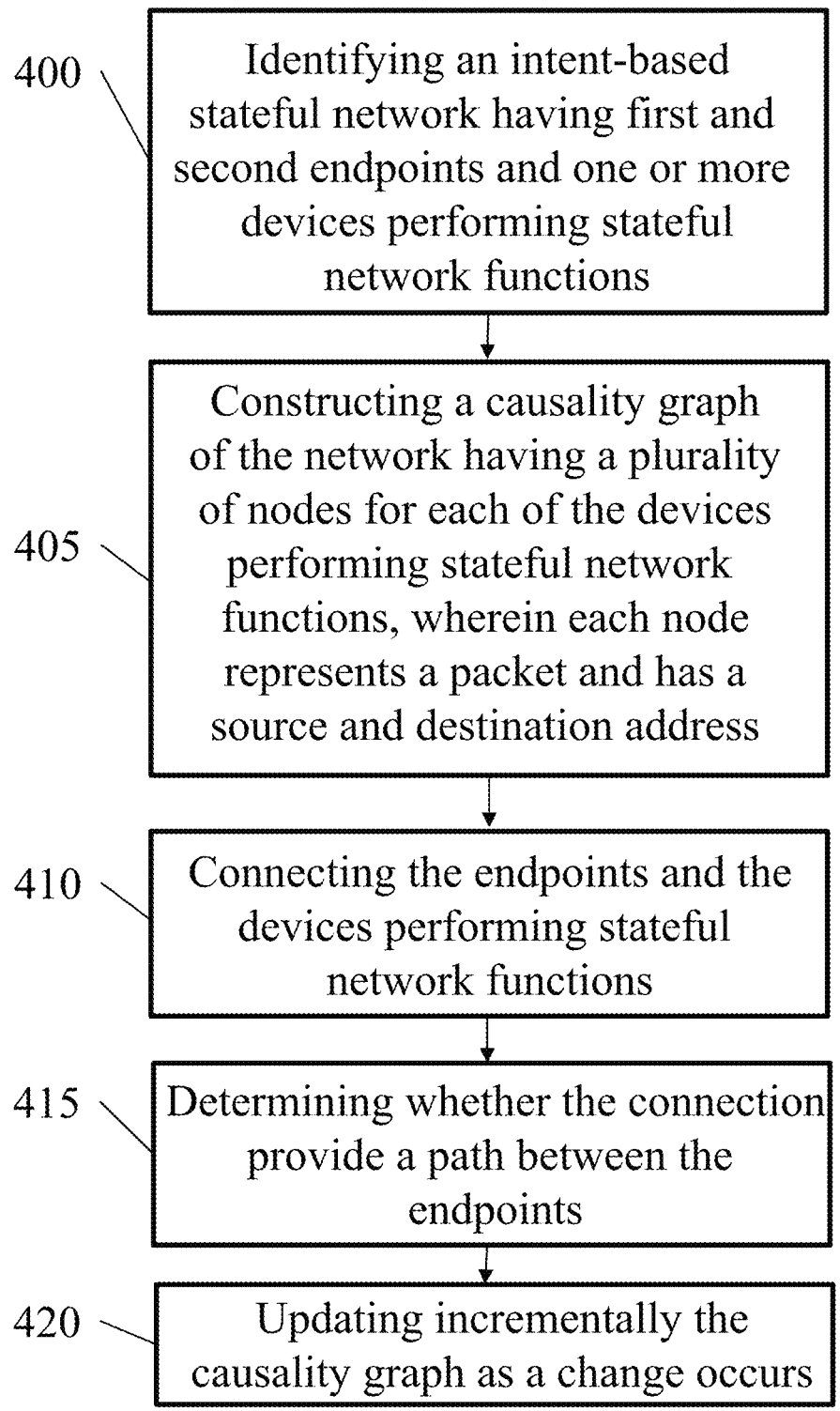
FIG. 4 a flow chart of an example process for incremental checking with a computing device in accordance with the present disclosure.

Turning to FIG. 4, a flow chart of an example process for incremental checking with a computing device is shown. Initially, the process includes identifying (400) an intent-based stateful network having a first endpoint, a second endpoint, and one or more devices performing stateful network functions between the first endpoint and the second endpoint. The first and second endpoints may include, for example, individual computing devices, hosts, servers, or any other type of endpoint that is configured to send or receive information across a network. Stateful network functions may include any such network function described above including, but not limited to, proxies, firewalls, NATs, load balancers, or any such devices that are stateful.

The process further includes constructing (405) a causality graph of the network. The causality graph includes a plurality of nodes for each of the one or more devices performing stateful network functions. Each node represents a packet event and each node has a source and destination address embedded in the header thereof. For each of the one or more devices performing stateful network functions, a receiving node and sending node may be identified in the causality graph. The source and destination identifiers may be indicated as integers, as discussed above, or other types of designators may be used such as, for example, letters, formulas, symbols, and the like.

The process further includes connecting (410) the first end point, the second endpoint, and the one or more devices performing stateful network functions to show causal relationships. For example, edges may be included between the endpoints and the stateful devices that shows a causal relationship between the endpoints and/or the stateful devices. The edges may be unidirectional, thereby showing a linear sequence of events that may illustrate reachability between network components.

The process further includes determining (415) whether the connections between the first endpoint, the second endpoint, and the one or more devices performing stateful network functions provide a path from the first endpoint to the second endpoint. The ability of packets to be sent between endpoints through stateful network functions defines the reachability of devices on the network. The path thereby indicates the different ways that a packet may be sent between endpoints and stateful functions within the network. For each path, connections may be provided on the causality graph in the form of lines and edges that indicate how a packet travels within the network.

The process further includes updating (420), incrementally, the causality graph as a change to the intent-based stateful network occurs. Changes to the network may include changes to network intents, topology, devices, rules, stateful network devices, or any other changes that may occur as the network is modified or otherwise grows. Changes to the causality graph may include the addition of nodes and edges, the removal of nodes and edges, changes to connections, changes to source and destination information, changes to represented stateful network devices, and the like. For example, the addition of a device may result in new nodes being added to causality graph along with new connections and edges therebetween. Similarly, removal of a device may result in the removal of the corresponding nodes, connections, and edges. As such, the addition or removal of devices may result in changes to the path between existing devices. The network may be rechecked when a change occurs, and the portion of the causality graph, that is affected may be modified. The remainder of the causality graph that is not affected by the change may not be modified. Accordingly, only a portion of the causality graph requires modification when a network change occurs.

Additionally, as changes to the network occur and the causality graph is modified, the causality graph may be saved so that subsequent changes may only result in changes to the saved modified causality graph. Instead of having to recheck and thus solve for connections between all network devices every time a network change occurs, only the affected aspects of the network must be rechecked. After rechecking, the causality graph may be updated and saved so that future changes may refer back to the modified causality graph, thereby further saving time that may otherwise be spent rechecking and solving for the entire network. By eliminating the requirement to recheck the entire network every time a change is made, the time required for the checks, as well as system resources may be saved.

The incremental updating of the causality graph may further include adding and/or removing an edge between at least two nodes in the causality graph. When a network device is added, a rule is changed, or an intent is added, deleted, or modified, the causality graph may be updated to take into consideration the changes to the network. In certain implementations, the network may be rechecked using, a solver, such as the SMT solver discussed above. The connections identified by the solver may then be saved as modifications to the causality graph. For example, if a change to the network results in additional links between network functions, new send and receive nodes may be added in the causality graph for the affected network functions. Additionally, new edges may be created thereby connecting the network functions within the causality graph. Similarly, if a network device is removed, nodes and edges that previously connected the devices would be removed from the causality graph.

The determining whether the connections between the first and second endpoints and the one or more devices performing stateful network functions may also include determining whether the path between the first, and second endpoints satisfies a network intent. If the connection satisfies the network intent and the path is validated, reachability between the endpoints may be achieved and the causality graph may be updated accordingly. Similarly, if the path results in a loop or otherwise does not result in reachability, the path is invalid. When a path is invalid, the causality graph may be updated to remove nodes and edges that result in the invalid path.

In certain implementations, a rule may be added to identify a set of intents that is affected by changes to the network. When such a rule is added, the causality graph may be updated based on an effect the rule has on the network. In the example described above, a deny rule was added that resulted in a loop in the path. The loop in the path thereby indicates that the path is not valid. The causality graph may then be updated to remove nodes and edges that are part of the invalid path while preserving the nodes and edges that are not affected by the change. Such incremental updating to the graph may thereby allow just the affected portions of the causality graph to be updated, thereby only requiring solver results for the affected portion of the network.

The additions of a rule may require specific modifications to the causality graph. For example, rule additions or rule deletions may result in adding a node, adding and edge, removing an edge, removing a node, and/or the addition or removal of endpoints and/or stateful network devices. Similarly, the addition, deletion, or modification to intents and/or devices may also require one or more of the above listed modifications to the causality graph.

In certain implementations, the causality graph may be automatically incrementally updated. More specifically, the causality graph may be updated substantially continuously as changes to the network occur. For example, a change with respect to an intent, a rule, or a device may automatically trigger the solver to provide solutions that represent the changes to reachability within the network. The solutions may be used to update the causality graph and the modified causality graph may be stored and used in subsequent checks of the network. Accordingly, a substantially updated causality graph for a network may be maintained and incrementally updated as changes to the network occurs. Rather than re-solve for every aspect of the network every time a network change occurs, only the portion of the network affected may be re-solved and the causality graph updated accordingly.

Figure 5:
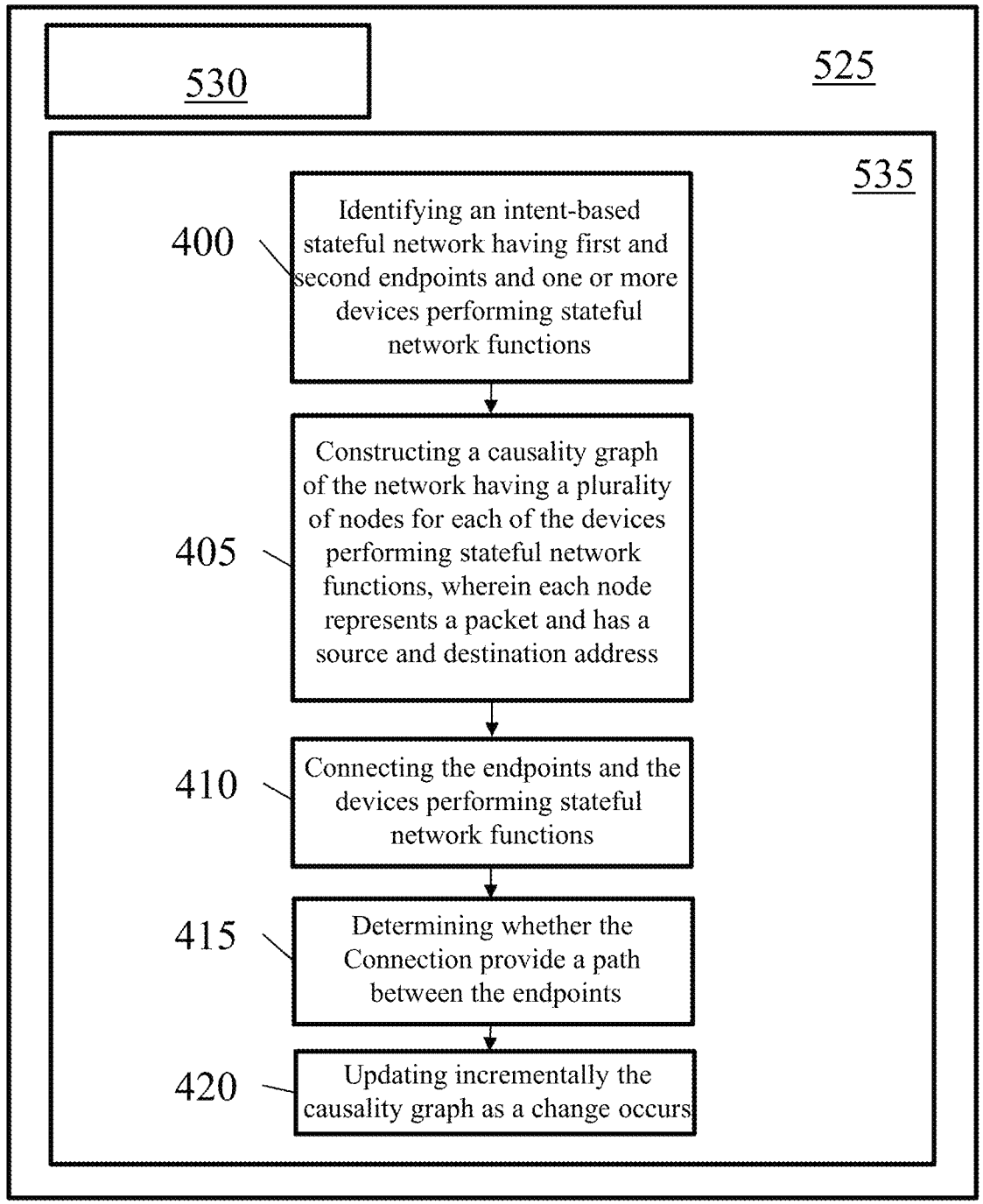
FIG. 5 is an example computing device with a hardware processor and accessible machine-readable instructions in accordance with the present disclosure.

Turning to FIG. 5, an example computing device with a hardware processor and accessible machine-readable instructions is shown in accordance with one or more example embodiments. FIG. 5 provides is an, example computing device 525, with a hardware processor 530, and accessible machine-readable instructions stored on a machine-readable medium 535 for performing the incremental intent checking for stateful networks discussed above with respect to one or more disclosed example implementations. FIG. 5 illustrates computing device 525 configured to perform the flow described in blocks 400, 405, 410, 415, and 420, discussed in detail, with respect to FIG. 4. However, computing device 525 may also be configured to perform the flow of other methods, techniques, functions, or processes described in this disclosure.

A machine-readable storage medium, such as 535 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 6:
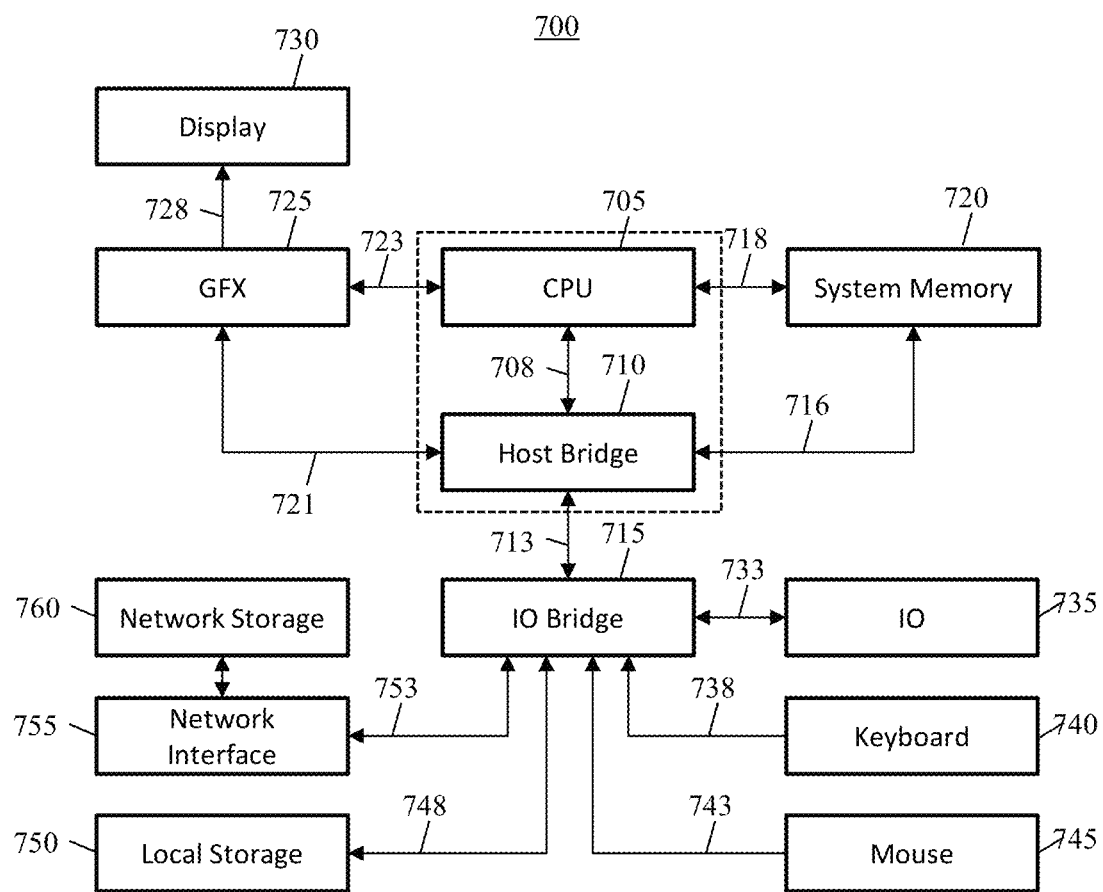
FIG. 6 is a schematic representation of a computer processing device that may be used to implement functions and processes in accordance with the present disclosure While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

Turning to FIG. 6, a schematic representation of a computer processing device 700 that may be used to implement functions and processes in accordance with one or more example embodiments is shown. FIG. 6 illustrates a computer processing device 700 that may be used to implement the systems, methods, and processes of this disclosure. For example, computing device 700 illustrated in FIG. 6 could represent a client device or a physical server device and include either hardware or virtual processor(s) depending on the level of abstraction of the computing device. In some instances (without abstraction), computing device 700 and its elements, as shown in FIG. 6, each relate to physical hardware. Alternatively, in some instances one, more, or all of the elements could, be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

FIG. 6 shows a computing system 700 in accordance with one or more example embodiments. Computing system 700 may be used to implement the incremental checking, to create causality graphs, or may be the target of such incremental checking. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to, system memory 720, and for embodiments where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce, chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 600, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to incrementally check the status of stateful network using causality graph.

In one or more examples, systems and methods disclosed herein may be used to decrease the amount of time required to provide intent checking within a stateful network.

In one or more examples, systems and methods disclosed herein may be used to decrease the amount of system resources required to provide intent checking with a stateful network.

In one or more examples, systems and methods disclosed herein may be used to save prior generated causality graphs for networks, thereby allowing for the incremental intent checking without having to resolve for the entire network.

In one or more examples, systems and methods disclosed herein may be used to provide intent checking for a portion of a stateful network without having to solve for the entire network every time a change to the network is made.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope, of claims below as illustrated by the example embodiments disclosed herein. Accordingly, the scope of the protection sought should be limited only by the appended claims.

What is claimed is:

1. A method of incremental intent checking with a computing device, the method comprising:
    identifying an intent-based stateful network having a first endpoint, a second endpoint, and one or more devices performing stateful network functions between the first endpoint and the second endpoint;
    constructing a causality graph of the network, the causality graph comprising a plurality of nodes for each of the one or more devices performing stateful network functions, each node representing a respective packet sending event or a respective packet receiving event associated with a corresponding device performing a stateful network function, wherein the constructing comprises connecting the first endpoint, the second endpoint, and the one or more devices performing stateful network functions to show causal relationships between the first endpoint and the second endpoint and the one or more devices performing stateful network functions;
    determining whether the connections between the first endpoint, the second endpoint, and the one or more devices performing stateful network functions provide a path from the first endpoint and the second endpoint; and
    updating, incrementally, the causality graph as a change to the intent-based stateful network occurs.

2. The method of claim 1, wherein the updating, incrementally, comprises at least one of adding and removing an edge between at least two nodes from the causality graph.

3. The method of claim 1, wherein the determining comprises determining whether the path between the first and the second endpoints satisfies a network intent.

4. The method of claim 1, wherein the network function performed by the one or more devices comprises at least one of a stateful firewall, a network address translator, and a load balancer.

5. The method of claim 1, further comprising adding a rule to identify a set of intents that is affected by the change and updating the causality graph based on an effect the rule has on the network.

6. The method of claim 5, wherein the updating the causality graph comprises at least one of adding an edge, adding an additional node, removing an edge, and removing an additional node.

7. The method of claim 1, further comprising removing an edge from the causality graph when a loop is introduced by the change.

8. The method of claim 1, wherein the path defines a reachability between the first endpoint and the second endpoint.

9. The method of claim 1, further comprising using a Satisfiability Modulo Theories solver to determine whether the path between the first endpoint and the second endpoint exists.

10. The method of claim 1, further comprising saving the updated causality graph for use in a subsequent network check.

11. The method of claim 1, further comprising updating, automatically, the causality graph when a change to the network occurs.

12. A computing device comprising at least:
a memory; and
a processor executing instructions in the memory to:
identify an intent-based stateful network having a first endpoint, a second endpoint, and one or more devices performing stateful network functions between the first endpoint and the second endpoint;
construct a causality graph of the network, the causality graph comprising a plurality of nodes for each of the one or more devices performing stateful network functions, each node representing a respective packet sending event or a respective packet receiving event associated with a corresponding device performing a stateful network function, wherein the construction of the causality graph comprises connecting the first endpoint, the second endpoint, and the one or more devices performing stateful network functions to provide a path from the first endpoint and the second endpoint;
determine whether the connections between the first endpoint, the second endpoint, and the one or more devices performing stateful network functions provide a path from the first endpoint and the second endpoint; and
update, incrementally, the causality graph as a change to the intent-based stateful network occurs.

13. The computing device of claim 12, wherein the processor further executes the instructions in the memory to add a rule to identify a set of intents that is affected by the change and updating the causality graph based on an effect the rule has on the network.

14. The computing device of claim 12, wherein the processor further executes the instructions in the memory to remove an edge from the causality graph when a loop is introduced by the change.

15. The computing device of claim 12, wherein the processor further executes the instructions in the memory to add an edge to the causality group when a new path in the network is established.

16. The computing device of claim 12, wherein the processor further executes the instructions in the memory to use a satisfiability modulo theories solver to determine whether the path between the first endpoint and the second endpoint exists.

17. The computing device of claim 12, wherein the processor further executes the instructions in the memory to identify a set of intents that are affected by the change and update the causality graph based on the set of intents that are affected by the change.

18. The computing device of claim 12 wherein the processor further executes the instructions in the memory to automatically update the causality graph when a change to the network occurs.

19. A non-transitory machine-readable storage medium encoded with instructions executable by a processor of a computing device, the non-transitory machine-readable storage medium comprising instructions to:
identify an intent-based stateful network having a first endpoint, a second endpoint, and one or more devices performing stateful network functions between the first endpoint and the second endpoint;
construct a causality graph of the network, the causality graph comprising a plurality of nodes for each of the one or more devices performing stateful network functions, each node representing a respective packet sending event or a respective packet receiving event associated with a corresponding device performing a stateful network function, wherein the construction of the causality graph comprises connecting the first endpoint, the second endpoint, and the one or more devices performing stateful network functions to provide a path from the first endpoint and the second endpoint;
determine whether the connections between the first endpoint, the second endpoint, and the one or more devices performing stateful network functions provide a path from the first endpoint and the second endpoint; and
update, incrementally, the causality graph as a change to the intent-based stateful network occurs.

20. The non-transitory machine-readable storage medium of claim 14, further comprising instructions to identify a set of intents that are affected by the change and update the causality graph based on the set of intents that are affected by the change.

* * * * *